United States Patent
Roullet et al.

(10) Patent No.: US 8,589,577 B2
(45) Date of Patent: Nov. 19, 2013

(54) TRANSMISSION OF IP PACKETS OF CONTENTS BY ADDITION TO THOSE IP PACKETS OF INFORMATION DATA RELATING TO THE CONTENTS

(75) Inventors: Laurent Roullet, Bures (FR); Nicolas Chuberre, Pibrac (FR)

(73) Assignee: Alcatel Lucent, Paris (FR)

( * ) Notice: Subject to any disclaimer, the term of this patent is extended or adjusted under 35 U.S.C. 154(b) by 1274 days.

(21) Appl. No.: 11/733,757

(22) Filed: Apr. 10, 2007

(65) Prior Publication Data
US 2007/0250639 A1     Oct. 25, 2007

(30) Foreign Application Priority Data
Apr. 11, 2006   (EP) ..................................... 06300352

(51) Int. Cl.
*G06F 15/16*     (2006.01)
*H04N 7/173*     (2011.01)

(52) U.S. Cl.
USPC .............................. 709/231; 709/246; 725/98

(58) Field of Classification Search
USPC ..................................... 709/231, 246; 725/98
See application file for complete search history.

(56) References Cited

U.S. PATENT DOCUMENTS

| | | | |
|---|---|---|---|
| 6,947,045 B1 * | 9/2005 | Ostermann et al. ............ | 345/473 |
| 2002/0136231 A1 * | 9/2002 | Leatherbury et al. ......... | 370/442 |
| 2003/0229900 A1 * | 12/2003 | Reisman ......................... | 725/87 |
| 2004/0010802 A1 | 1/2004 | Visharam et al. | |
| 2005/0135284 A1 * | 6/2005 | Nanda et al. .................. | 370/294 |
| 2005/0135318 A1 * | 6/2005 | Walton et al. ................. | 370/338 |
| 2005/0190774 A1 | 9/2005 | Wiegand | |

OTHER PUBLICATIONS

Wenger M M Hannuksela T Stockhammer M Westerlund D Singer S: "RTP Payload Format for H.264 Video; rfc3984.txt;" IETF Standard, Internet Engineering Task Force, IETF, CH, Feb. 2005, pp. 1-83, XP015009755.

Nafaa et al.: "Joint loss pattern characterization and unequal interleaved FEC protection for robust H.264 video distribution over wireless LAN" Computer Networks, Elsevier Science Publishers B.V., Amsterdam, NL, vol. 49, No. 6, Dec. 19, 2005, pp. 766-786, XP005105124.

* cited by examiner

*Primary Examiner* — Ranodhi Serrao
(74) *Attorney, Agent, or Firm* — Fay Sharpe LLP

(57) ABSTRACT

IP encapsulation equipment encapsulates, into bursts, IP packets representing sets of multimedia data delivered by at least one multimedia content server. The bursts are accompanied beforehand by information data at least partly defining the set of data that is integrated into those IP packets and/or the content of which that set of data forms part, with a view to the broadcasting thereof to receiver equipments via a communication network. The information data added to the received IP packets is analyzed to instruct the encapsulation means to encapsulate at least some of those IP packets in selected positions in the bursts as a function of the corresponding information data. In this manner, all the IP packets including, the data of a set, are encapsulated in a single burst.

21 Claims, 1 Drawing Sheet

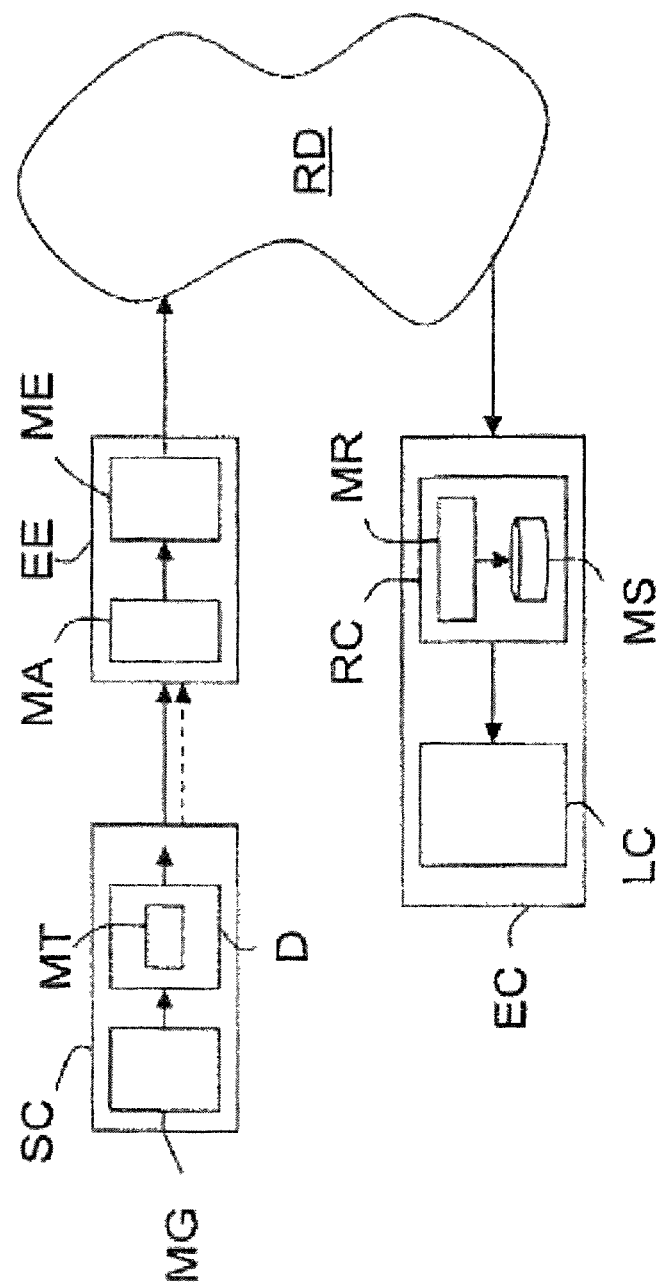

TRANSMISSION OF IP PACKETS OF CONTENTS BY ADDITION TO THOSE IP PACKETS OF INFORMATION DATA RELATING TO THE CONTENTS

CROSS-REFERENCE TO RELATED APPLICATIONS

This application is based on European Patent Application No. EP06300352.9 filed Apr. 11, 2006, the disclosure of which is hereby incorporated by reference thereto in its entirety, and the priority of which is hereby claimed under 35 U.S.C. §119.

BACKGROUND OF THE INVENTION

1. Field of the Invention

The invention relates to the transmission of multimedia contents via a communication network and more precisely to the broadcasting of multimedia contents between a content server and content receivers via a communication network adapted to broadcast multimedia contents.

2. Description of the Prior Art

Here "multimedia content" means sets of data of the same type, such as data files or videos, for example. A set of data generally constitutes what the person skilled in the art calls an ADU (Application Data Unit). For example, a set of data from a data file constitutes a segment of that file and a set of data from a video constitutes a frame of type I, B or P of a main (or base) layer or of an enhanced layer of an image from that video. In the field of broadcasting rich media contents, as they are known, the sets of data form part of an MPEG-4 stream and may constitute an interactive scene with which a user can interact (or interface). That scene is usually transmitted in parallel with the video stream "sent in streaming mode" according to the BIFS standard (Binary Format for Scenes—a binary format for two-dimensional or three-dimensional audiovisual contents based on VRML and part 11 of the MPEG4 standard). It must be remembered that a BIFS scene consists of BIFS access control units (sets of commands and presentation times) that produce a BIFS stream. Launching a BIFS stream consists in applying to the scene the modifications that are described in the BIFS commands and then displaying the result on the user's terminal. As in the case of a video, certain BIFS commands can describe an entire scene (which can then be decoded without knowing the preceding BIFS commands, like a frame of type I (in video coding)), while other commands modify the existing scene, like a frame of type P (in video coding).

Moreover, here "communication network adapted to broadcast contents" means a satellite network, such as an SDMB (Satellite Digital Multimedia Broadcast) network, for example, a terrestrial network, where appropriate of radio type, such as a UMTS network adapted to broadcasting (for example of MBMS (Multimedia Broadcast/Multimedia Services) or DVB-H (Digital Video Broadcasting-Handhelds) (mobile television) type)), or a hybrid network, i.e. a combined satellite and terrestrial network, such as a radio network of DVB-H type adapted to satellite links, for example.

As the person skilled in the art is aware, to broadcast a content, for example a video, between a content server and content receivers, the first step is to generate in the content server a continuous stream of IBP frames in the form of IP (Internet Protocol) packets. Those IP packets are then transmitted to an IP encapsulation equipment in order for it to encapsulate them in bursts conforming to the mode of transmission used, for example the TDMA (Time Division Multiple Access) mode. The bursts (containing the encapsulated packets) are then broadcast to the content receivers via the "broadcast" network so that the receivers can reconstitute the content represented by the IP packets and either store that reconstituted content temporarily with a view to subsequent use by a content player or send that reconstituted content to a content player with a view to immediate or subsequent use.

The IP encapsulation equipment generally encapsulates the IP packets that it receives from one or more content servers in successive bursts as a function of their order of arrival. The types and/or structures of the various contents represented by the IP packets generally being indistinguishable at the IP level but more generally at the port or RTP level, encapsulation is effected independently of the type and/or the structure of the content or contents at the same IP address. It is always possible to distinguish streams by their IP address, for example by sending the two layers (main and enhanced (or improved)) to two IP addresses in the same burst. Apart from this implying a constraint on the encoder and the addressing plan and therefore requiring non-negligible signaling tables, this does not improve the processing of the burst as information such as the beginning or the end is still not known and appropriate decisions therefore cannot be taken. The sole benefit lies in being able to add redundancy data (FEC data) in a differentiated manner and to effect temporal interleaving. It can therefore happen that a content is divided over a plurality of bursts separated by a relatively long time interval.

Now, in certain modes of operation of a content receiver or the associated content player, for example in the case of changing television channel, this temporal separation can lead to an increase in the time necessary for displaying a first video image. In fact, when a video receiver (or player) changes channel it must be synchronized to a new burst, then find the first valid I frame, and then display it, which generates a cumulative delay equal to the sum of the synchronization time, the time to receive the first valid I frame, and the time to decode the latter.

Similarly, when a file receiver receives a burst of data on a channel, it must be synchronized to that burst, then collect the IP packets contained in that burst, and then effect decoding of FEC (Forward Error Correction) or MPE-FEC (in the case of a DVB-H network) type of those IP packets in order to be able to correct any errors, then to be able to reconstitute the file segments that they represent, and finally to store the reconstituted segments in the form of a file. If a segment is distributed over a plurality of bursts, and it is a question of the last, or even of the only, segment of the file, it is necessary to wait for a period at least equal to the duration of a burst to be able to retrieve the segment and therefore to form the file. Moreover, if the segment creation application adds its own FEC protection to the MPE-FEC protection of the initial file, redundancy and a loss of performance result from the fact that errors must be looked for in each burst whereas error correction would be improved if it were effected over several bursts. In this case, it is therefore better not to apply the protection (error correction) at the MPE-FEC level and to restrict the protection to FEC protection at the level of the server.

It will also be noted that in radio broadcast type networks the packet error rates (PER) may be high. If the errors relate to IP packets that represent sets of data of small size (for example frames of type B), the consequences are limited. However, if the errors relate to IP packets that represent sets of data of large size (for example frames of type I), this can have the consequence of rendering unusable several other sets of received data (cascade effect on complementary frames of different types). The error correction techniques (of FEC or MPE-FEC type) being applied at the level of the IP encapsulation equipments to IP packets that do not distinguish the different sizes of the sets of data that they represent, it is not possible to vary their efficacy as a function of these size differences.

To reduce the packet error rate it is undoubtedly possible to increase the rate (or level) of error correction, but this has the consequence of increasing the amount of redundant data (known as "FEC data") and therefore of consuming bandwidth, which is undesirable because the bandwidth is limited.

Other error rate reduction solutions may be envisaged, for example managing the end-to-end quality of service (QoS), which necessitates interactive communication between the server and the client, or analyzing in the IP encapsulation equipment the sets of data that are contained in the IP packets, which obliges the IP encapsulator to understand the semantics of the application, which is not easy for a network infrastructure equipment (increased processing even though the bit rates are high) and difficult to maintain (the software must be updated each time a new application is deployed). However, these solutions induce other drawbacks that make them difficult, or even impossible, to use, or which rule out standardization because their implementation varies from one type of server to another.

No known solution proving entirely satisfactory, the invention therefore has the object of improving on the situation.

SUMMARY OF THE INVENTION

To this end the invention proposes a device dedicated to processing IP packets generated by a multimedia content server and representing sets of multimedia data to be broadcast via a communication network, each comprising start and end data and each being associated with at least one type.

This processor device comprises processor means responsible for adding to the IP packets generated by the content server information data at least partly defining the set of data that is integrated into the IP packets and/or the content of which the set of data forms part and/or information relating to the transmission of the content and usable by the network, so that the server can deliver at an output the IP packets and the corresponding information data.

The device according to the invention may have other features, and in particular, separately or in combination:
  its processor means may be responsible for adding to the IP packets generated by the server information data indicating start data or end data and/or the type of the set of data that is integrated into the IP packets and/or the type of content of which the set of data forms part;
  its processor means may be responsible for adding the information data to the IP packets by integrating them into a header attached thereto and defined by a selected transport protocol, for example the Real Time Protocol (RTP); alternatively, they may generate signaling comprising the information data and adapted to be delivered by the content server in parallel with the corresponding IP packets via a dedicated bidirectional connection that is not standardized or in the band;
  in the presence of sets of data defining video frames, the type of a set of data may for example be defined by the type of the video frame that it represents, which is selected in a group comprising at least frames of types I, B and P;
  in the presence of sets of data defining segments of files, the type of a set of data may for example be defined by the type of data of the file segment that it defines, which is selected in a group comprising at least the type "DATA" and the type "FEC";
  in the presence of sets of data of BIFS type, the type of a set of data defines for example an overall or partial scene renewal.

The invention also proposes a multimedia content server equipped with a processor device of the type described hereinabove.

The invention further proposes IP encapsulation equipment comprising encapsulation means responsible for encapsulating in bursts IP packets delivered by at least one multimedia content server of the type described hereinabove and representing sets of multimedia data with a view to broadcasting thereof to receiver equipments via a communication network.

This IP encapsulation equipment comprises analysis means for analyzing information data added to received IP packets in order to instruct the encapsulation means to encapsulate at least some of the IP packets in selected positions in the bursts as a function of the corresponding information data and so that all the IP packets including the data of a set are encapsulated in a single burst (varying the elements included in that burst or the size of the burst or the protection (error correction) in the burst).

The IP encapsulation equipment according to the invention may have other features, and in particular, separately or in combination:
  its analysis means may be responsible for establishing relative transmission priorities of IP packets as a function of the corresponding information data and instructing the encapsulation means to encapsulate the IP packets as a function of the priorities established;
  its analysis means may be responsible, in the event of unavailability of the entirety of the IP packets corresponding to a set of data associated with a given priority, for instructing the encapsulation means to encapsulate IP packets corresponding to a set of data associated with a lower priority;
  its analysis means may be responsible, in the event of availability of the entirety of the IP packets corresponding to a set of data but a lack of space in a burst currently being constituted by the encapsulation means and partially filled with IP packets, for instructing the encapsulation means to extract from the burst currently being constituted at least some of the IP packets already integrated in order to integrate into the burst currently being constituted the entirety of the IP packets corresponding to the set of data and to defer the transmission of the IP packets extracted;
  its analysis means may be responsible for instructing the encapsulation means to extract and to defer the transmission of IP packets containing redundant error correction data;
  its analysis means may be responsible for instructing the encapsulation means to reduce the size of the bursts temporarily;
  its analysis means may be responsible for instructing the encapsulation means to increase the size of the bursts temporarily;
  its analysis means may be responsible, in the event of availability of the entirety of the IP packets corresponding to a set of data but of a lack of space in a burst currently being constituted by the encapsulation means and partially filled with IP packets, for instructing the encapsulation means to eliminate from the burst currently being constituted at least some of the IP packets already integrated and/or to reduce the level of error correction applied to the encapsulated IP packets and/or to increase the size of the bursts temporarily so as to integrate into the burst currently being constituted the entirety of the IP packets corresponding to the set of data;

its analysis means may be responsible for instructing the encapsulation means to increase the level of error correction applied to the encapsulated IP packets;

its analysis means may be responsible for instructing the encapsulation means to increase dynamically the level of error correction (or protection) they apply to the encapsulated IP packets up to a selected threshold;

its analysis means may be responsible for instructing the encapsulation means to apply to the IP packets encapsulated in a burst a level of error correction that varies as a function of the priorities associated therewith;

its analysis means may be responsible for instructing the encapsulation means to apply the highest level of error correction to the IP packets that are associated with the highest priority;

its analysis means may be responsible for instructing the encapsulation means to duplicate data belonging to certain bursts defining the same content and corresponding to the same category in order to group it in a single burst defining that content and associated with that category.

The invention is particularly well adapted, although not exclusively so, to radio communication networks of DVB-H type (including the evolutions thereof adapted to satellite links). However, although this is not limiting on it, the invention also concerns any type of TDMA mode (time-division multiplexing) broadcast network and IP/TDMA networks such as WiMax or WiFi networks, for example.

BRIEF DESCRIPTION OF THE DRAWINGS

Other features and advantages of the invention will become apparent on reading the following detailed description and examining the appended drawing, the single FIGURE whereof shows very schematically and functionally a content server equipped with one embodiment of a processor device according to the invention delivering continuous streams of IP packets for IP encapsulation equipment according to the invention connected to a broadcast network to which communication equipment including a content receiver and a content player is also connected.

DETAILED DESCRIPTION OF THE PREFERRED EMBODIMENT

The appended drawing constitutes part of the description of the invention as well as contributing to the definition of the invention, if necessary.

The invention has the object of optimizing the encapsulation of IP packets representing sets of data defining multimedia contents in bursts intended to be broadcast via a communication network to communication equipment including at least one multimedia content receiver.

It is considered hereinafter by way of nonlimiting example that the communication network is a cellular (or mobile) radio network of UMTS/DVB-H (mobile television) type. However, the invention is not limited to that type of communication network. It concerns in fact any communication network, preferably a radio network, capable of broadcasting multimedia contents, whether of satellite type, for example an SDMB network, or of terrestrial type (where applicable of radio type), for example a UMTS/MBMS or UMTS/DVB-H network, or of hybrid type, i.e. both satellite and terrestrial, for example a radio network constituting an evolution of the DVB-H according to the DVB Forum standards.

Moreover, it is considered hereinafter that the communication equipment (for which the broadcast multimedia contents are intended) consists of mobile terminals, for example mobile telephones, equipped with a multimedia content receiver and a multimedia content player. However, the invention is not limited to that type of communication equipment. It concerns in fact any type of mobile terminal (such as a laptop or communicating personal digital assistant (PDA)) or fixed terminal (such as a computer or server), equipped with a multimedia content receiver and where applicable with a multimedia content player, and any type of multimedia content receiver that can be connected to a broadcast network and is intended to supply a multimedia content player or storage means with broadcast multimedia content.

The single FIGURE represents a system for transmission (broadcasting) of multimedia contents between a multimedia content server SC and communication equipment EC including (or taking the form of a multimedia content receiver RC via IP encapsulation equipment EE and a broadcast network RD (here of UMTS/DVB-H type).

A (multimedia content) server SC comprises a generator module MG responsible for transforming multimedia contents into sets of data and then integrating those sets of data into IP packets in order to deliver at its output continuous streams of IP packets that are sent to IP encapsulation equipment EE.

Here the expression set of data means what the person skilled in the art calls an ADU (Application Data Unit). For example, a set of data from a data file constitutes a segment of that file and a set of data from a video constitutes a type I, B or P frame of a main (or base) layer or an enhanced layer of an image from that video or a BIFS type stream.

The IP encapsulation equipment EE comprises an encapsulation module ME responsible for encapsulating the IP packets received in bursts conforming to the transmission mode that is used by the broadcast network RD to which it is connected. That transmission mode is the TDMA mode (Time Division Multiple Access (time-division multiplexing)) mode, for example.

The bursts (here TDMA bursts) are then transmitted, generally at regular intervals, by the IP encapsulation equipment EE to the broadcast network RD in order for the latter to broadcast them to the communication equipment EC (or the content receivers RC).

The content receivers RC include a receiver module MR responsible for reconstituting each content broadcast by means of IP packets encapsulated in the successive received bursts, for example. As shown, the content receivers RC may also include a storage module MS (memory or database) responsible for storing at least temporarily the contents reconstituted by their receiver module MR if they are not transmitted directly to a content player LC. If the content receiver RC includes no storage module MS, each content reconstituted by its receiver module MR is sent either to an external storage module with a view to subsequent use by a content player LC or to a content player LC with a view to immediate or subsequent use.

The invention relates only to the multimedia content server SC and the encapsulation equipment EE.

More precisely, the invention proposes to equip certain (multimedia content) servers SC with a processor device D comprising a processor module MT responsible for adding to the IP packets generated by the generator module MG information data that defines at least in part the set of data that each of them represents in part and/or the content of which that set of data forms part and/or information relating to the transmission of the content and usable by the network (i.e. any information necessary to the encapsulation equipment EE for optimizing its task (for example the relative priority of the various traffics (or streams), in the manner of the signaling of the DIFFSERV standard that uses the TOS (Type Of Service) header to enable management of the relative priorities of simultaneous streams (high priority/medium priority/low priority)).

This information data may be of any type provided that it is of a kind enabling optimization of the constitution of the bursts (here TDMA bursts) of IP packets at the level of the encapsulation equipment EE, given the optimization criterion or criteria selected. For example, it may be information data indicating an IP packet including the start or end data of a set of data, the type of a set of data that is partly integrated in an IP packet, the type of the multimedia content of which a set of data that is partly integrated in an IP packet forms part, or duplications of data to be effected in a burst.

Note that more than one item of information data may be added to the same IP packet. The number of items of information data added to an IP packet depends on the optimization criterion or criteria selected at the level of the encapsulation equipment EE and the type of multimedia content to be broadcast.

For example, if the multimedia content is a video, and the data sets are therefore video image frames, it is advantageous for the processor module MT to add to IP packets that represent a video frame information data that indicates at least the type (I, B or P) of that video frame.

It may also be useful for the processor module MT to add to IP packets that represent a video frame information data that indicates the type of layer to which the video frame that they represent belongs, i.e. a main layer or an enhanced layer.

It may also be useful for the processor module MT to add to an IP packet that represents the start or the end of a video frame information data that indicates that start or that end.

It may also be useful for the processor module MT to add to IP packets that represent a video frame information data that indicates if the data in the IP packets must be duplicated in a burst in order to optimize the "zapping" time (switching from one content channel to another). For example, it may be useful to duplicate the basic information at the end of the frame in order to reduce the zapping time (see below).

In the presence of multiple video streams, it may also be useful for the processor module MT to add to IP packets that represent a video frame of one of the streams the identifier of that stream.

It may also be useful for the processor module MT to add to IP packets information data that indicates the policy for insertion of data from those IP packets into a "synthetic" burst.

For example, if the multimedia content is a data file (DATA), and the sets of data are therefore file segments, it is advantageous for the processor module MT to add to an IP packet that represents the start or the end of a data file segment information that indicates that start or that end.

It may also be useful for the processor module MT to add to IP packets that represent a file segment information data that indicates the type of data of that file segment, i.e. if it is data of "DATA" type and "FEC" type (redundant data added by an error correction technique such as FEC (Forward Error Correction) or MPE-FEC in the case of a DVB-H network).

If the data is of BIFS type, type information may be added, for example, indicating overall renewal of the scene (very high priority) or partial renewal (lower priority).

Information can be added in two ways.

For example, the processor module MT can add information data to the IP packets by integrating it in a header that it attaches to the latter. For example, a header may be used that is defined by a signaling protocol such as RTP (Real Time Protocol), in particular in the case of video type multimedia contents. In fact, the H.264 video standard proposes, in Request For Comments (RFC) 3984 ("RTP Payload Format for H.264 Video"), to transport video over RTP. More precisely, a network abstraction layer (NAL) is defined that enables the display of the images to be decoupled from their transportation. Consequently, in the case of transportation by means of packets, the portion of the RTP container reserved for payload data contains an NAL that provides information on the transported data. For example, network abstraction layers of types 7 ("sequence parameter set") and 8 ("picture parameter set") may be used at the start of a stream of IP packets to define its structure, its dimensions and the video coding tools used. Thereafter, network abstraction layers of types 1 ("coded slice of a non-IDR picture") and 5 ("coded slice of an IDR picture") may be used to indicate that frames are of types P/SP/B and I/SI, respectively.

Alternatively, the processor module MT may generate signaling dedicated specifically to the transportation of information data between the server SC and the encapsulation equipment EE (shown by the dashed line arrow in the single FIGURE). In this case, the content server SC delivers at its output the IP packets generated by its generator module MG and the corresponding signaling generated by its processor device D, for example in parallel. A communication protocol may be used for this purpose that takes the form of a non-standard dedicated connection providing synchronization to within 25 ms.

The processor device D according to the invention, and in particular its processor module MT, may be produced in the form of software (or electronic data processing) modules, electronic circuits or a combination of circuits and software.

There has been described hereinabove an embodiment of a content server SC in which the generator module MG and the processor device D are dissociated. However, a variant may be envisaged in which the processor device D forms part of the generator module MG.

The encapsulation equipment EE that receives the IP packets and the corresponding information data comprises an analysis module MA and an encapsulation module ME.

The analysis module MA is responsible for analyzing the information data that has been added to the received IP packets in order to supply to the encapsulation module ME the instructions necessary for constituting bursts (here TDMA bursts) of IP packets, given the optimization criterion or criteria selected. Of the optimization criteria there may be cited by way of example the bit rate or the zapping time.

More precisely, the analysis module MA is responsible for instructing the encapsulation module ME to encapsulate at least some of the IP packets received in selected positions within the bursts as a function of the information data that corresponds to them and in order for all the IP packets that include data from a set of data to be encapsulated in a single burst.

Of the instructions that the analysis module MA can send to the encapsulation module ME, there may for example be cited the relative transmission priorities of IP packets. There may in fact exist a correspondence between certain information data and transmission priority levels.

For example, if the multimedia content is a video, the highest priority level may be assigned to the IP packets of type I frames belonging to a main layer, then a lower priority level to the IP packets of type B and P frames belonging to that main layer, then an even lower priority level to the IP packets of type I frames belonging to an enhanced layer (complementary to the main layer), then a still lower priority level to the IP packets of type B and P frames belonging to that enhanced layer.

For example, if the multimedia content is a data file (DATA), the highest priority level may be assigned to the IP packets of the file segments including DATA type data and then a lower priority level assigned to the IP packets of the file segments including data of FEC type (redundant data).

For example, if the multimedia content is a scene conforming to the BIFS standard, the highest priority level may be assigned to the IP packets that correspond to a command concerning an entire scene and a lower level assigned to packets that correspond to a command concerning a fraction of the scene.

In the presence of such priority levels, the analysis module MA can instruct the encapsulation module ME to encapsulate the IP packets in the bursts as a function of the priority levels that correspond to the types of multimedia that they respectively contain.

If all the IP packets that correspond to a set of data have not been received in full and these IP packets are those associated with the highest priority level among the IP packets received, the analysis module MA can then also instruct the encapsulation module ME to encapsulate other IP packets received previously that conjointly define the entirety of another set of data associated with a lower level. This optimizes the filling of the burst currently being constituted and the IP packets associated with a higher priority level are transmitted at best only during the next burst (if they have all arrived). This is particularly true if it is certain that the priority data will be entirely contained within the next burst, which necessitates a relatively accurate idea of the amount of priority data, unless it is decided to limit the size of the burst to put other data in other bursts.

If the entirety of the group of IP packets corresponding to a priority data set has been received but there is insufficient room in the burst that is currently being constituted to integrate the entirety of that group, the analysis module MA can then also instruct the encapsulation module ME to extract one or more IP packets (or even all of them) from the burst currently being constituted to free the space necessary to integrate the IP packets of the priority group.

In this case, the analysis module MA can also instruct the encapsulation module ME either to defer the transmission of the extracted IP packets or to eliminate some or all of the extracted IP packets.

Extraction with a view to deferred transmission relates in particular, although not exclusively, to redundant error correction data. However, this deferment also enables the analysis module MA, if the entirety of the group of IP packets corresponding to a priority set of data has been received but there is insufficient room in the burst that is currently being constituted to integrate the entirety of that group, to instruct the encapsulation module ME to increase the size of the burst in order to be able to accommodate all of the priority data. This is particularly useful in a variable encoding application context enabling bit rate performance to be improved.

Furthermore, if the analysis module MA notices that the number of IP packets to be encapsulated that each data set defines is decreasing or that the throughput of groups of IP packets to be encapsulated is decreasing, it can instruct the encapsulation module ME temporarily to reduce the size of the bursts (i.e. the number of encapsulated IP packets that they contain). This is particularly useful in the context of variable bit rate encoding, given that it is advantageous to use this function if a plurality of streams are received in parallel (statistical improvement).

If the duration of a burst cannot be modified and the number of IP packets of the groups that represent the sets of data prevent each group from being encapsulated in a single burst given the corresponding redundant (FEC) data that accompanies it, the analysis module MA can instruct the encapsulation module ME to reduce the total number of IP packets (those of the group and the redundant packets) in order to adapt the number of IP packets defining each set of data (once encapsulated) as a function of the duration of the burst, so to speak.

Such an adaptation may be effected, for example, by reducing the level of error correction that is applied to the IP packets to be encapsulated by the encapsulation module ME by means of an FEC or MPE-FEC type error correction technique. In fact the higher the error correction level, the greater the amount of redundant data to be added to the IP packets to be broadcast.

If the size of the bursts allows it, the analysis module MA can instruct the encapsulation module ME to enhance the level of error correction that it applies to the encapsulated IP packets.

The error correction level can be increased, or reduced, dynamically, preferably within the limits of a selected threshold.

The error correction level variation may be the same for all the IP packets to be encapsulated, whatever their associated priority level.

Alternatively, this variation may equally be effected selectively, for example as a function of the priority level that is associated with the IP packets to be encapsulated. For example, the analysis module MA can instruct the encapsulation module ME to apply the highest error correction level to IP packets that are associated with the highest priority level and one or more lower error correction levels to IP packets that are associated with lower priority level(s). Thus the encapsulation module ME can apply to IP packets containing DATA type data a higher level of error correction than it applies to IP packets containing data of FEC type. Similarly, the encapsulation module ME may apply to IP packets containing data of a frame I a higher level of error correction than it applies to IP packets containing data from a P or B frame. The same type of variation may equally be effected between frames of a main layer and frames of an enhancement layer corresponding to that main layer or between BIFS commands.

Finally, if a burst comprises sufficient space for inserting all the IP packets corresponding to a set of data, the analysis module MA can also be responsible for instructing the encapsulation module ME to start by placing in the burst header IP packets that contain the data of the set and then to place afterwards IP packets that contain FEC type data (redundant data introduced by an error correction technique).

If all the IP packets that correspond to a set of data have been received in their entirety, those IP packets being those of the received IP packets associated with the highest priority level that must be duplicated in the frame for reasons of optimization (of the zapping time), the analysis module MA can instruct the encapsulation module ME to encapsulate these IP packets previously received in a dedicated burst with other IP packets of the same kind (or of the same category, i.e. having NALs including the same type of frame and the same type of layer (main or enhanced)). The IP packets necessary for optimizing the zapping time are thus grouped together by placing the burst at the end of the frame.

Some IP packets of the first bursts of a frame may therefore be duplicated and grouped together at the end of the frame. For example, in the presence of frames consisting of ten bursts of data, an eleventh burst is provided consisting of the duplication of certain information contained in at least some of the ten "intermediate" bursts.

Accordingly, a terminal that changes content channel has to wait for only a fraction of the duration of the frame before retrieving a frame of type I, even of basic quality (as opposed to enhanced (or improved) quality). The user then has minimum information for starting the display on the screen of his terminal. This is to the detriment of transmission capacity and may be considered a supplementary service.

Thus all the various actions described hereinabove and instructed by the analysis module MA, given information data added to the IP packets, enable optimization of the position of a set of data (or ADU) or the throughput of the sets of data (or ADU) in a transmission channel (for example a DVB-H transmission channel) or the quality of service (QoS) on a transmission channel (for example a DVB-H channel) or the transmission capacity (number of video channels).

The analysis module MA and/or the encapsulation module ME of the encapsulation equipment EE according to the invention may be produced in the form of software (or electronic data processing) modules, electronic circuits or a combination of circuits and software.

The invention is not limited to the processor device D, multimedia content server SC and encapsulation equipment EE embodiments described hereinabove by way of example only, and encompasses all variants that the person skilled in the art might envisage within the scope of the following claims.

There is claimed:

1. An apparatus for processing IP packets, comprising:
   a multimedia content server that transforms multimedia contents into sets of data and integrates the sets of data to form continuous streams of IP packets, each set of data comprising start and end data and being associated with at least one type of data, wherein the multimedia content server adds information data to the IP packets, the information data at least partly defining the set of data that is integrated into the IP packets, at least partly defining the multimedia content of which the set of data forms part, or at least partly defining information relating to the transmission of the multimedia content to communication equipment via a broadcast network; and
   an IP encapsulation equipment in operative communication with the multimedia content server that analyzes the information data to optimize encapsulation of the continuous streams of IP packets into bursts, wherein at least some of the IP packets are encapsulated in selected positions in the bursts as a function of the corresponding information data so that all IP packets including the data of a set are encapsulated in a single burst.

2. The apparatus of claim 1, the multimedia content server comprising:
   a generator module that transforms the multimedia contents into the sets of data and integrates the sets of data into the IP packets; and
   a processor device in operative communication with the generator module that adds the information data to the IP packets to form the continuous streams of IP packets, the continuous streams of IP packets with the information data delivered to the IP encapsulation equipment.

3. The apparatus according to claim 2, wherein said processor device is adapted to add said information data to said IP packets generated by the generator module by integrating the information data into a header attached to the IP packets and defined by a selected transport protocol.

4. The apparatus according to claim 2, wherein said processor device is adapted to generate signaling comprising said information data and adapted to be delivered by said multimedia content server in parallel with the corresponding IP packets.

5. The apparatus according to claim 2, wherein said type of a set of data is defined by at least one of the type of video frame that it represents, the type of file segment that it represents, and the type of scene that it represents.

6. The apparatus of claim 1, the IP encapsulation equipment comprising:
   an analysis module that analyzes the information data and forms instructions for the encapsulation of the continuous streams of IP packets; and
   an encapsulation module in operative communication with the analysis module that performs the encapsulation of the continuous streams of IP packets into the bursts, wherein the bursts conform to a transmission mode compatible with the broadcast network based at least in part on the instructions.

7. The apparatus according to claim 6, wherein said analysis module establishes relative transmission priorities of IP packets as a function of the corresponding information data and instructs said encapsulation module to encapsulate said IP packets as a function of said priorities established.

8. The apparatus according to claim 6, wherein said analysis module is employed, in the event of unavailability of the entirety of the IP packets corresponding to a set of data associated with a given priority, to instruct said encapsulation module to encapsulate IP packets corresponding to a set of data associated with a lower priority.

9. The apparatus according to claim 6, wherein said analysis module is employed, in the event of availability of the entirety of the IP packets corresponding to a set of data but a lack of space in a burst currently being constituted by said encapsulation module and partially filled with IP packets, to instruct said encapsulation module to extract from said burst currently being constituted at least some of the IP packets already integrated in order to integrate into said burst currently being constituted said entirety of the IP packets corresponding to said set of data and to defer the transmission of the IP packets extracted.

10. The apparatus according to claim 6, wherein said analysis module is adapted, in the event of availability of the entirety of the IP packets corresponding to a set of data but of a lack of space in a burst currently being constituted by said encapsulation module and partially filled with IP packets, to instruct said encapsulation module to eliminate from said burst currently being constituted at least some of the IP packets already integrated and/or to reduce a level of error correction applied to said encapsulated IP packets and/or to increase the size of said bursts temporarily so as to integrate into said burst currently being constituted said entirety of the IP packets corresponding to said set of data.

11. A method of processing IP packets, comprising:
   transforming multimedia contents into sets of data, each set of data comprising start and end data and being associated with at least one type of data;
   integrating the sets of data to form continuous streams of IP packets;
   adding information data to the IP packets, wherein the information data at least partially defines the corresponding set of data associated with the IP packets and relates to encapsulation of the corresponding continuous stream of IP packets into bursts for transmission of the multimedia content to communication equipment via a broadcast network, the information data facilitating optimization of the encapsulation;

forming instructions for the encapsulation of the continuous streams of IP packets based at least in part on analyzing the information data, the instructions facilitating optimization of the encapsulation; and encapsulating the IP packets into bursts conforming to a transmission mode compatible with the broadcast network based at least in part on the instructions, wherein all IP packets for each given set of data are encapsulated into a single burst and at least some of the IP packets are encapsulated in selected positions in the bursts.

12. The method set forth in claim 11 wherein optimization of the encapsulation is based at least in part on optimization of at least one of a position of at least one set of data, throughput of sets of data in a transmission channel, quality of service on a transmission channel, and transmission capacity.

13. The method set forth in claim 11, further comprising:
adding information data to IP packets in sets of data representing video multimedia content that indicates if the data in the IP packets is to be duplicated in the corresponding burst to optimize "zapping" time.

14. The method set forth in claim 11, further comprising:
adding information data to IP packets in sets of data representing video multimedia content that indicates an identifier for the corresponding stream of IP packets.

15. The method set forth in claim 11, further comprising:
generating signaling relating to transport of the information data between a multimedia content server and an IP encapsulation equipment, wherein the signaling is communicated in parallel to the corresponding stream of IP packets.

16. A method of processing IP packets, comprising:
receiving continuous streams of IP packets comprising sets of data representing multimedia contents and information data, each set of data comprising start and end data and being associated with at least one type of data, wherein the information data at least partially defines the corresponding set of data associated with the IP packets and relates to encapsulation of the corresponding continuous stream of IP packets into bursts for transmission of the multimedia content to communication equipment via a broadcast network, the information data facilitating optimization of the encapsulation;

forming instructions for the encapsulation of the continuous streams of IP packets based at least in part on analyzing the information data, the instructions facilitating optimization of the encapsulation; and encapsulating the IP packets into bursts conforming to a transmission mode compatible with the broadcast network based at least in part on the instructions, wherein all IP packets for each given set of data are encapsulated into a single burst and at least some of the IP packets are encapsulated in selected positions in the bursts.

17. The method set forth in claim 16, further comprising:
transforming the multimedia contents into the sets of data;
integrating the sets of data to form the continuous streams of IP packets; and
adding the information data to the IP packets.

18. The method set forth in claim 16 wherein optimization of the encapsulation is based at least in part on optimization of at least one of a position of at least one set of data, throughput of sets of data in a transmission channel, quality of service on a transmission channel, and transmission capacity.

19. The method set forth in claim 16 wherein the instructions for the encapsulation include instructions to dynamically adjust an error correction level between predetermined levels for at least one burst in conjunction with optimization of the encapsulation.

20. The method set forth in claim 16 wherein the instructions for the encapsulation include instructions to adjust a size of at least one burst between predetermined sizes in conjunction with optimization of the encapsulation.

21. The method set forth in claim 16 wherein the instructions for the encapsulation include instructions to extract and defer IP packets or extract and eliminate IP packets from at least one burst in conjunction with optimization of the encapsulation.

* * * * *